(12) United States Patent
Callahan

(10) Patent No.: US 6,953,492 B2
(45) Date of Patent: Oct. 11, 2005

(54) MEMBRANE TECHNOLOGY TO REDUCE NITROGEN IN NATURAL GAS

(75) Inventor: Richard A. Callahan, Isle La Motte, VT (US)

(73) Assignee: Enerfex, Inc., Williston, VT (US)

( * ) Notice: Subject to any disclaimer, the term of this patent is extended or adjusted under 35 U.S.C. 154(b) by 0 days.

(21) Appl. No.: 10/297,087
(22) PCT Filed: Jun. 1, 2001
(86) PCT No.: PCT/US01/16478
  § 371 (c)(1),
  (2), (4) Date: Mar. 27, 2003
(87) PCT Pub. No.: WO01/91888
  PCT Pub. Date: Dec. 6, 2001

(65) Prior Publication Data
  US 2004/0035291 A1 Feb. 26, 2004

Related U.S. Application Data
(60) Provisional application No. 60/208,325, filed on Jun. 1, 2000.

(51) Int. Cl.⁷ .............................................. B01D 53/22
(52) U.S. Cl. ...................... 95/50; 96/4; 96/14; 429/254
(58) Field of Search ........................... 95/45, 50; 96/4, 96/7, 8, 10, 13, 14; 429/57, 86, 129, 254

(56) References Cited

U.S. PATENT DOCUMENTS

| | | |
|---|---|---|
| 3,303,105 A | 2/1967 | Komikoff et al. |
| 4,119,417 A | 10/1978 | Heki et al. |
| 4,397,661 A | 8/1983 | King et al. |
| 4,857,082 A | 8/1989 | DiMartino, Sr. et al. |
| 5,229,222 A * | 7/1993 | Tsutsumi et al. .............. 429/19 |
| 5,282,969 A | 2/1994 | Xu |
| 5,378,263 A | 1/1995 | Prasad |
| 5,425,801 A | 6/1995 | Prasad |
| 5,429,662 A | 7/1995 | Fillet |
| 5,482,539 A | 1/1996 | Callahan |
| 5,501,722 A | 3/1996 | Toy et al. |
| 5,507,855 A | 4/1996 | Barry |
| 5,669,958 A | 9/1997 | Baker et al. |
| 2004/0086779 A1 * | 5/2004 | Higley et al. .................. 429/86 |

* cited by examiner

Primary Examiner—Robert H. Spitzer
(74) Attorney, Agent, or Firm—Sughrue Mion, PLLC

(57) ABSTRACT

An apparatus and process for providing purified natural gas wherein a natural gas feed mixture of hydrocarbons, nitrogen, and other permeable gases is provided to a semi-permeable membrane separator having a relatively higher selectivity for methane and other hydrocarbons and a relatively lower selectivity for nitrogen, to thereby provide a gaseous permeate product enriched in hydrocarbons and diminished in nitrogen.

5 Claims, 1 Drawing Sheet

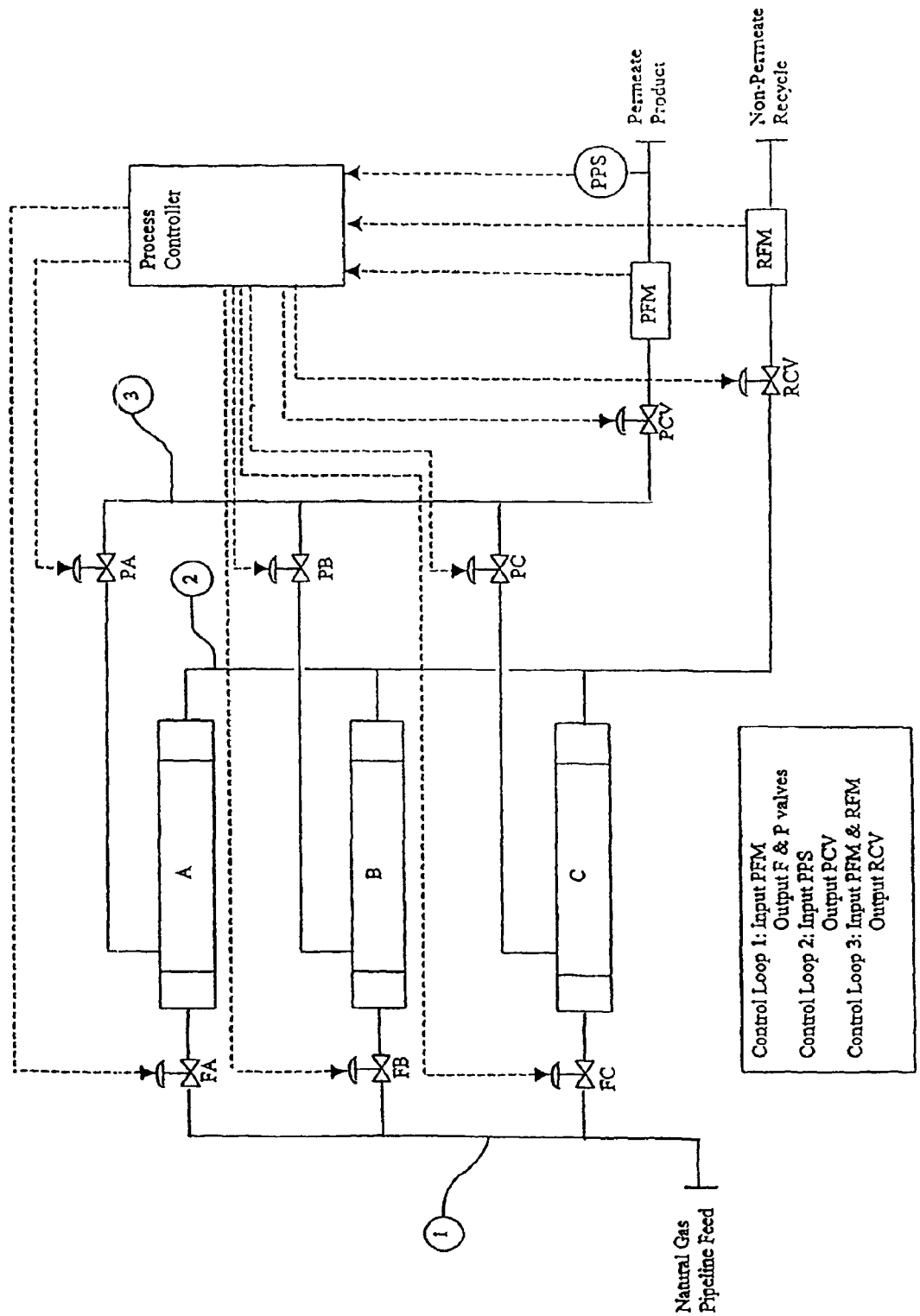

MEMBRANE TECHNOLOGY TO REDUCE NITROGEN IN NATURAL GAS

This application claims priority from Provisional Application No. 60/208,325, filed Jun. 1, 2000.

BACKGROUND OF THE INVENTION

Frequently natural gas contains excess nitrogen, making it commercially unusable. If wellhead natural gas has more than about 10.0 vol % nitrogen, then it may not have a minimum heating value specified by a pipeline company. Until now, there has been no technology available to economically reduce nitrogen content in natural gas. As a result there are many capped wells that remain unused.

Pipeline natural gas can contain up to about 10.0 vol % nitrogen if $C_2$+ and higher hydrocarbons are added to increase heating value to a nominal commercial standard heating of 1,000±20 Btu per standard cubic foot (SCF). The balance is predominantly methane, usually 80–95 vol %, and small amounts of carbon dioxide, usually 0.0–2.5 vol %.

In the past the nitrogen content posed no problem for the most common application of natural gas space heating, if the heating value was 1,000±20 Btu per SCF. There is a new use for natural gas as a fuel for fuel cells (e.g., ONSI Corporation's Phosphoric Acid Fuel Cell (PAFC)) wherein a nitrogen content over 6.0 vol. % can severely reduce useful operating life.

The PAFC typically has two main operating sections:
1. A steam reformer where natural gas is partially oxidized by steam over a catalyst to yield hydrogen and carbon dioxide.
2. A stack of bipolar fuel cells with concentrated phosphoric acid electrolyte wherein hydrogen reacts electrochemically with oxygen from air to produce electricity, heat and water.

The reformer catalyst can promote a side reaction between nitrogen, if present in the natural gas, and hydrogen to form ammonia according to the following chemical equation:

(1)

Although the conversion of nitrogen to ammonia is low, the upper allowable limit for useful stack life is 1.0 ppmv of ammonia in the reformed gas. The ammonia concentration appears to be directly proportional to the amount of nitrogen in the natural gas. It has been found that a PAFC reformer creates about 1.0 ppmv ammonia if the natural gas contains about 6.0 vol % nitrogen. The level of 1.0 ppmv ammonia is generally considered to be the maximum allowable ammonia content for optimum cell stack life. At 1.0 ppmv ammonia, a PAFC cell stack would have about six years useful operating life before it would have to be renewed or replaced.

In the cell stack, ammonia hydrolyzes to ammonium ion as ammonium hydroxide, reacting with the phosphate ion in the aqueous phosphoric acid electrolyte. The ammonium ion neutralizes the phosphate ion in an elementary acid base reaction, forming the salt ammonium meta-phosphate according to the following chemical equation:

$$4NH_4OH + 4H_3PO_4 \rightarrow (NH_4)_4P_4O_{12} + 8H_2O \qquad (2)$$

Converting a portion of the electrolyte to the neutral salt degrades its hydrogen ion conductivity and eventually the rated electric power output of the fuel cell. It has been found that a PAFC fueled by natural gas with an average 6.0 vol. % nitrogen content and the resultant average 1.0 ppmv ammonia created in the reformed gas has a useful operating life of about six years. It has furthermore been found that if the average nitrogen content increases to 8.5 vol. %, there will be a proportional increase in ammonia concentration and an exponential reduction in useful operating life to about 1.5 years.

The ratio of fuel cell operating life, and therefore degradation rates, appears to vary directly with the fourth power of the ratio of nitrogen concentration. The degradation ratio is the inverse of the life cycles ratio:

$(8.5 \text{ vol. \%}/6.0 \text{ vol. \%})^4 = 4.028;\ 1/4.028 \approx 1.5 \text{ yrs}/6.0 \text{ yr.}$ \qquad (3)

$(6.0 \text{ vol. \%}/8.5 \text{ vol. \%})^4 = 0.248;\ 1/0.248 \approx 6.0 \text{ yrs}/1.5 \text{ yr.}$ \qquad (4)

Elementary chemical reaction kinetics also supports this conclusion. An irreversible reactant rate expression for the depletion (−r) of the ammonium ion as ammonium hydroxide derived from the stoichiometric equation (2) is:

$$-r = k \times [C_{NH_4OH}]^4 \times [C_{H_3PO_4}]^4 \qquad (5)$$

where −r is moles per unit volume depleted per unit time, k is the temperature dependent rate constant, and C is the reactant concentration in moles per unit volume. The reaction rate is fourth order with respect to ammonium concentration. In other words, the rate of ammonium conversion and hence the rate of electrolyte degradation varies as the fourth power of the ammonium concentration, which is directly proportional to the nitrogen concentration.

SUMMARY OF THE INVENTION

To overcome the foregoing problems associated with high nitrogen, the present invention is now directed to an apparatus and a process by which a gas separation membrane can separate a natural gas stream containing nitrogen into a permeate product stream reduced in nitrogen and a non-permeate recycle stream rich in nitrogen.

In a preferred embodiment, a silicone (poly-alkyl siloxane such as poly-dimethyl siloxane) gas separation membrane has been found to be particularly useful. It has been shown that this type of membrane selectively permeates hydrocarbons over nitrogen and in particular shows a moderate selectivity for methane and higher selectivity for $C_2$+ and higher hydrocarbons over nitrogen. When pipeline natural gas containing hydrocarbons and nitrogen is fed to the membrane, a permeated stream enriched in hydrocarbons and diminished in nitrogen is produced. The non-permeate stream is reduced in hydrocarbons and enriched in nitrogen.

Furthermore it has been found that the non-permeate stream heating value varied inversely with the amount of $C_2$+ and higher hydrocarbons in the feed, the permeate recovery rate, and, directly with the permeate pressure. The higher the fraction of feed components that are more permeable than methane, the larger the heating value reduction in the non-permeate. It has been found that if the $C_2$+ hydrocarbon content is less than 1.0% of the feed, then the non-permeate stream heating value reduction is equal to or less than 1.0% compared to the feed. Increasing the permeate pressure reduces permeate recovery and increases the heating value of the non-permeate stream.

If the non-permeate heating value is maintained at 99.0% or more compared with that of the feed, then it may be returned to the pipeline at no cost to the PAFC user. The amount of heating value reduction varies directly with the percentage of permeate recovery. The lower the permeate recovery is, the lower the heating value reduction is, and vice versa. In this case the permeated product recovery rate is of no consequence since the PAFC user only pays for the permeate product stream.

BRIEF DESCRIPTION OF THE DRAWING

A continuous range of permeate product (product) flows is controlled by three input/output control loops in a process controller. The three input devices are: 1) Product pressure sensor (PPS) (control loop 2); 2) Product Flow Meter (PFM) (control loops 1 and 3); and 3) Recycle Flow Meter (RFM) (control loop 3).

DETAILED DESCRIPTION OF THE INVENTION

The percentage of feed that is recovered as reduced nitrogen permeate product is governed by:
(1) the higher hydrocarbons content in the feed;
(2) the permeate pressure; and
(3) the desired product recovery.

If $C_2+$ hydrocarbons and other components in the feed are equal to or less than 1.0 vol. %, then the non-permeate will have a heating value equal to or greater than 99.0% of the feed. Non-permeate with 1.0% or less heating value reduction compared to the feed can be recycled back into the pipeline for general use. A higher percentage of $C_2+$ hydrocarbons in the feed increases the product recovery rate and decreases the non-permeate stream heating value.

Increasing permeate pressure reduces permeate recovery and increases non-permeate heating value. For most natural gas compositions, the heating value of the non-permeate will be within 99.0% of the feed if the increase in permeate back pressure reduces the permeate recovery rate to about 30.0% or less.

MEMBRANE PREPARATION

In a preferred embodiment a silicone monomer (e.g., polydimethylsiloxane, hexamethyl disiloxane, etc.) is introduced into a plasma-generating vessel under vacuum, where it is polymerized and cross-linked in situ onto a microporous polymeric hollow fiber such as polypropylene (e.g., Celgard X20-240 and Celgard X20-400 from Hoechst Celanese and KPF190M and KPF205M-1 from Mitsubishi) or a polysulfone (e.g., Filtron MW Cut 10K Dalton from Pall). In the subject membrane a silicone coating of about 0.5 $\mu$m thick is plasma deposited on a supporting microporous polypropylene hollow fiber, of about 250 $\mu$m outside diameter and about 200 $\mu$m inside diameter.

Natural gas, either at pipeline pressure, or compressed to a required membrane operating pressure, is provided to a single membrane separator unit or the first stage of a multiple membrane separator unit system. The permeate pressure is always lower than the feed pressure to ensure a partial pressure difference driving force across the membrane.

Normally a single membrane separator unit is sufficient if no more than a 30.0% nitrogen reduction is required. If more nitrogen reduction is necessary, permeate can be re-compressed and provided to succeeding membrane separator units until the desired nitrogen reduction is achieved. A succeeding membrane separator units' non-permeate is recycled back to the feed of the first membrane separator, e.g., as disclosed in U.S. Pat. No. 5,482,539.

The final membrane separator permeate is the eventual reduced nitrogen natural gas product. The first membrane separator's non-permeate can be either sent to a special use consumer, if the heating value is less than 99.0% of the feed, or recycled back to the gas utility distribution system if the heating value is 99.0% or more of the feed.

Tables 1 and 2 below present field test data that illustrates the relationship between the critical parameters of nitrogen and heating value reduction, higher hydrocarbon content in the feed and permeate product recovery. Table 1 sets forth results with a natural gas feed having a $C_2+$ content of about 0.05 vol. %, and Table 2 for a feed with a $C_2+$ content of about 4.7 vol. %. The test membrane module was two feet long by four inches in diameter having two cartridges each having about 50 square feet of hollow fiber membrane area of the silicone type described above.

In both Tables, Run 1 represents a test membrane operating at a higher recovery than Run 2. Comparing Tables 1 and 2 it can be seen that about the same permeate recovery rate gives a higher nitrogen reduction when $C_2+$ is more than 1.0 vol. %.

When the $C_2+$ content is less than 0.1 vol. % as in Table 1, the heating value reduction is less than 0.5% over a wider range of recovery rates compared to Table 2. If the $C_2+$ content is about 5.0 vol. % as in Table 2, then the heating value reduction decreases to about 1.0% or less as the recovery approaches about 30.0% or less.

The drawing shows a nitrogen reduction membrane (NRM) apparatus comprising a preferred embodiment of the invention. High nitrogen content natural gas enters the NRM in feed header 1. The gas is distributed into parallel membrane banks A, B, or C, depending whether or not feed header valves FA, FB, or FC and permeate product header valves PA, PB, or PC are open or closed. Non-permeate gas enriched in nitrogen exits the NRM in non-permeate recycle header 2. Permeate gas diminished in nitrogen exits the NRM in permeate product header 3.

TABLE 1

Natural Gas With Less Than 0.05% $C_2+$

| | Feed | | Non-Permeate | | Permeate | | Nitrogen Reduction | |
|---|---|---|---|---|---|---|---|---|
| Run | Flow, scfh | $N_2$, vol. % | Flow, scfh | $N_2$, vol. % | Flow, scfh | $N_2$, vol. % | $N_2$, reduct. | recovery |
| 1 | 310 | 6.1 | 180 | 8.3 | 130 | 4.1 | 33% | 42% |
| 2 | 470 | 5.9 | 300 | 7.5 | 170 | 4.1 | 30% | 36% |

TABLE 1-continued

Natural Gas With Less Than 0.05% $C_2+$

Heating Value (HV) Reduction

| | Feed | | Non-Permeate | | | Permeate | | |
|---|---|---|---|---|---|---|---|---|
| | Flow, | | | | | | | |
| Run | scfh | Btu/cf | Flow, scfh | btu/cf | HV reduct. | Flow, scfh | btu/cf | recovery |
| 1 | 310 | 939 | 180 | 938 | 0.1% | 130 | 961 | 42% |
| 2 | 470 | 942 | 300 | 939 | 0.3% | 170 | 964 | 36% |

TABLE 2

Natural Gas With More Than 4.7% $C_2+$

Nitrogen Reduction

| | Feed | | Non-Permeate | | Permeate | | | |
|---|---|---|---|---|---|---|---|---|
| | Flow, | | | | | | | |
| Run | scfh | $N_2$, vol. % | Flow, scfh | $N_2$, vol. % | Flow, scfh | $N_2$, vol. % | $N_2$, reduct. | recovery |
| 1 | 877 | 4.3 | 482 | 5.6 | 395 | 2.6 | 38% | 45% |
| 2 | 745 | 4.1 | 503 | 4.8 | 242 | 2.8 | 33% | 32% |

Heating Value (HV) Reduction

| | Feed | | Non-Permeate | | | Permeate | | |
|---|---|---|---|---|---|---|---|---|
| | Flow, | | | | | | | |
| Run | scfh | Btu/cf | Flow, scfh | btu/cf | HV reduct. | Flow, scfh | btu/cf | recovery |
| 1 | 877 | 1006 | 482 | 985 | 2.1% | 395 | 1031 | 45% |
| 2 | 745 | 1007 | 503 | 997 | 1.0% | 242 | 1028 | 32% |

According to a preferred embodiment of the invention, the permeate product recovery rate is optimized by controlling one or both of the following operating parameters:

1. Permeate product header pressure controlled by the number of modules operating for a given product demand calculated in control loop 1 using the product flow meter (PFM) as the input process variable sensor. Recovery varies directly with the consequent back pressure created by product control valve (PCV); and
2. Feed flux (flow rate per unit area of membrane surface) compared to a set point feed flux in control loop 3. Recycle flow is restricted by the non-permeate recycle control valve (RCV) % open to control feed flux to a set point calculated using PFM+recycle flow meter (RFM) as the input process variables. Recovery varies inversely with the feed flux.

Permeate product pressure is controlled by comparing the process variable product pressure sensor (PPS) to a product pressure set point in control loop 2. Permeate product pressure is maintained by the permeate product control valve (PCV) % open calculated using PPS as the input process variable.

Referring again to the drawing, the three output devices are: 1. On/off membrane bank valve pairs; 2. Product Control Valve (PCV); and 3. Recycle control valve (RCV). Each membrane bank uses a pair of on/off feed and product header control valves (FA/PA, FB/PB & FC/PC) that determine product flow. The product control valve (PCV) controls the product flow and product pressure. The recycle control valve (RCV) controls the feed flux and product recovery.

While the invention has been described in detail and with reference to various embodiments thereof, it will be apparent to one skilled in the art that various changes and modifications can be made therein without departing from the spirit and scope thereof.

What is claimed is:

1. A process for providing a purified natural gas permeate product from a membrane separator unit to a fuel cell, which permeate product has a nitrogen content of 6% or less, comprising subjecting a feed gas mixture of hydrocarbons, nitrogen, and other gases commonly associated with natural gas to a semi-permeable membrane separator having a relatively higher selectivity for methane and other hydrocarbons and a relatively lower selectivity for nitrogen, to thereby provide a gaseous permeate product enriched in hydrocarbons and diminished in nitrogen, and providing said gaseous permeate product to a fuel cell.

2. A process as in claim 1, wherein there is provided a reduced nitrogen content permeate with a nitrogen reduction equal to or greater than 30.0% of feed nitrogen content.

3. A process as in claim 1, wherein there is provided an enriched nitrogen content non-permeate having a heating value equal or greater than 99.0% of the heating value of the feed gas.

4. A process as in claim 1, wherein there is recovered 70.0% or more of the feed gas mixture as non-permeate, and said non-permeate has a heating value of 99.0% or more than the heating value of the feed gas mixture.

5. An apparatus wherein a natural gas feed mixture of hydrocarbons, nitrogen and other permeable gases is provided to a feed header connected to a system of membrane separators, which separator system provides a permeate product enriched in hydrocarbons and diminished in nitrogen to a product header directed to a fuel cell and a non-permeate recycle enriched in nitrogen and diminished in hydrocarbons to a recycle header directed to a special use consumer or re-directed back to a gas utility distribution system.

* * * * *